United States Patent
Freire et al.

(10) Patent No.: US 11,154,958 B2
(45) Date of Patent: Oct. 26, 2021

(54) METHOD AND ROBOTIC ASSEMBLY FOR PERFORMING OPERATIONS ON A TARGET WORKPIECE

(71) Applicant: ABB SCHWEIZ AG, Baden (CH)

(72) Inventors: Jesús Freire, Vitoria (ES); Jordi Artigas, Barcelona (ES); Ramon Casanelles Moix, Sant Cugat del Vallès (ES)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/938,412

(22) Filed: Jul. 24, 2020

(65) Prior Publication Data
US 2021/0023662 A1    Jan. 28, 2021

(30) Foreign Application Priority Data
Jul. 24, 2019 (EP) .................................. 19382628.6

(51) Int. Cl.
*B25J 11/00* (2006.01)
*B23P 21/00* (2006.01)
(Continued)

(52) U.S. Cl.
CPC ............. *B23P 19/04* (2013.01); *B23P 21/002* (2013.01); *B23P 21/004* (2013.01);
(Continued)

(58) Field of Classification Search
CPC ....... B23P 21/004; B23P 21/002; B23P 19/10; B23P 19/08; B23P 19/06; B23P 19/04; B23P 2700/50; B23P 21/008; B35J 15/0408; B35J 15/0019; B35J 11/007; B35J 11/005; B35J 9/1697; B62D 65/026; B62D 65/02
See application file for complete search history.

(56) References Cited

U.S. PATENT DOCUMENTS

2006/0167587 A1    7/2006  Read
2017/0106924 A1*   4/2017  Hafenrichter ........ B25J 11/0075

FOREIGN PATENT DOCUMENTS

WO    WO2016081443 A1    5/2016

OTHER PUBLICATIONS

Extended European Search Report of the European Patent Office for Application No. 19382628.6, dated Jul. 5, 2020 issued by the European Patent Office, Munich, Germany.

* cited by examiner

*Primary Examiner* — Jermie E Cozart
(74) *Attorney, Agent, or Firm* — Peter B. Scull; EIP US LLP

(57) ABSTRACT

A method for performing operations on a target workpiece including taking an operating tool unit by an industrial robot, carrying the tool unit to the workpiece, releasing the tool unit at the workpiece, moving the robot away from the tool unit, performing one or more operations on the workpiece through the tool unit while the tool unit moves with the workpiece; and retrieving the tool unit from the workpiece after the tool unit has performed the one or more operations on the workpiece. A robotic assembly for performing a method including at least one industrial robot, at least one operating tool unit, and a quick tool changer for detachably coupling the tool unit with the industrial robot including a first tool changer part arranged in the industrial robot and a second tool changer part arranged in the operating tool unit.

20 Claims, 3 Drawing Sheets

(51) Int. Cl.
*B62D 65/02* (2006.01)
*B23P 19/04* (2006.01)
*B23P 19/06* (2006.01)
*B25J 15/00* (2006.01)
*B25J 9/16* (2006.01)
*B25J 15/04* (2006.01)
*B23P 19/10* (2006.01)
*B23P 19/08* (2006.01)

(52) U.S. Cl.
CPC ........... *B23P 21/008* (2013.01); *B25J 11/005* (2013.01); *B23P 19/06* (2013.01); *B23P 19/08* (2013.01); *B23P 19/10* (2013.01); *B23P 2700/50* (2013.01); *B25J 9/1697* (2013.01); *B25J 11/007* (2013.01); *B25J 15/0019* (2013.01); *B25J 15/0408* (2013.01); *B62D 65/02* (2013.01); *B62D 65/026* (2013.01)

METHOD AND ROBOTIC ASSEMBLY FOR PERFORMING OPERATIONS ON A TARGET WORKPIECE

TECHNICAL FIELD

The present disclosure relates to performing one or more operations on workpieces by industrial robots while the workpieces are conveyed through one or more stations in, for example, automotive production lines such as automotive final assembly lines. Examples of workpieces are vehicle bodies and parts thereof. Examples of operations are assembling vehicle components or parts by such industrial robots while vehicle bodies are conveyed through one or more of said stations.

BACKGROUND

In the automotive industry, automotive assembly lines usually include at least one assembly station for assembling vehicle bodies where operators and/or industrial robots operate to assemble parts, such as seats, doors, windshields, wheels, steering mechanisms, etc., to the vehicle body. In many cases, vehicle bodies are advanced continuously along the assembly line by suitable transport devices such as different types of conveyors or AGVs (Automated Guided Vehicles).

Industrial or assembly robots in assembly lines include a quick changer part intended to be coupled to a corresponding quick changer part that is arranged in a tool unit for carrying said tool unit. The tool unit is controlled to perform a certain operation in a target position of the vehicle body. In some cases, especially when operations in assembly lines take a long time such as for example 10s or more, the assembly robots may be driven on tracks running parallel to the assembly line.

When a vehicle body that is advanced along the vehicle body assembling line by said transport devices arrives at an assembling station, assembly robot robots are driven therealong considering the travel speed of the vehicle body in the conveyor. As the assembly robots move, their arms are properly driven such that the tool unit performs an operation on the vehicle body.

While operations on the vehicle body are being performed, assembly robots have to wait until tool units have finished said operations to pick another tool unit for performing other operations. This is time consuming and therefore inefficient.

It is an aspect of the present disclosure providing a method and a robotic assembly for performing one or more operations on a target workpiece, by which assembly times can be optimised.

SUMMARY

A method and a robotic assembly for performing one or more operations on a target workpiece is disclosed herein as it will be described in detail below.

The present disclosure finds application mainly in vehicle assembly lines including one or more stations where industrial robots are arranged to perform one or more operations on workpieces. However, many other different applications are possible.

As used herein, the term 'station' refers to a zone in a vehicle assembly line at which one part of a vehicle assembly operation is performed. Also within the meaning of the present disclosure, a 'line' includes a series of stations with machines, equipment, workers, etc., where parts of a motor vehicle, such as for example a vehicle body, are assembled, said parts passing from one station to another station.

A method for performing one or more operations on a target workpiece such as a vehicle body is provided herein.

The method includes taking an operating tool unit by an industrial robot. As used herein, an operating tool unit refers to an arrangement including at least one tool that can be carried by an industrial robot and configured to perform one or more operations such as screwing, riveting, trimming, clipping, assembling, etc.

The method further includes carrying the operating tool unit to the target workpiece, releasing the operating tool unit in a suitable position at the target workpiece, moving the industrial robot away from the operating tool unit, performing one or more operations on the target workpiece through the operating tool unit, and retrieving the operating tool unit from the target workpiece after the operating tool unit has performed said operations on the target workpiece.

One or more operations on the target workpiece through the operating tool unit may be, and preferably are, performed while the operating tool unit moves with the target workpiece.

Although the above method steps have been described in a specific order, the present disclosure encompasses variations in the order of said method steps. Furthermore, additional steps may be executed between the steps described above without departing from the scope of the present disclosure.

Once an operating tool unit has been released from an industrial robot, said industrial robot moves away from the operating tool unit. Meanwhile, the operating tool unit performs operations on the target workpiece and the industrial robot can perform some other tasks.

In one example, carrying the operating tool unit to the target workpiece may be performed by referring to a position of a mechanical feature selected from one or more of holes, recesses, protrusions, and clamps. Said step of carrying the operating tool unit to the target workpiece may include docking the operating tool unit to the target workpiece. Docking the operating tool unit to the target workpiece may be performed by one or more of mechanical, magnetic, or vacuum systems.

The step of retrieving the operating tool unit from the target workpiece may include connecting the same or another industrial robot to the operating tool unit and releasing the operating tool unit from the target workpiece. Since, in operation, the operating tool unit moves with the target workpiece, the step of retrieving the operating tool unit from the target workpiece may be performed in the same or different station where the operating tool unit was released at the target workpiece.

The step of taking an operating tool unit by the industrial robot may include moving the industrial robot towards the target workpiece and docking the operating tool unit to the industrial robot. It is also foreseen that the industrial robot might be stationary and the operating tool unit is driven towards the target workpiece and docking the industrial robot to the operating tool unit. In any case, the step of moving the industrial robot towards the target workpiece may involve reaching a desired suitable positioning through one or more of visual technology and compliance technology. Other technologies are of course possible.

In a further, alternative aspect, a method is also disclosed for performing operations on a target workpiece such as a vehicle body. The method includes taking an operating tool unit by an industrial robot for performing one or more operations on the workpiece, carrying the operating tool unit to the target workpiece, arranging the operating tool unit in a suitable position at the target workpiece, and performing operations on the target workpiece such as screwing, riveting, trimming, clipping, assembling, etc. through the operating tool unit.

In this alternative aspect, when the operating tool unit has been released from the industrial robot, the industrial robot does not move away from the operating tool unit while performing one or more operations on the target workpiece. In one example, no quick tool changer is provided in the industrial robot but a fixed plate for detachably coupling an operating tool unit.

Also in this alternative aspect, carrying the operating tool unit to the target workpiece may be performed by referring to a position of a mechanical feature selected from one or more of holes, recesses, protrusions, and clamps. Carrying the operating tool unit to the target workpiece may include docking the operating tool unit to the target workpiece such as by mechanical, magnetic, vacuum systems, or even a combination thereof.

The present disclosure further relates to a robotic assembly for performing operations on a target workpiece according to the method described above. Said robotic assembly includes at least one industrial robot, at least one operating tool unit, and a quick tool changer for detachably coupling the operating tool unit with the industrial robot. A base tool unit may be provided for detachably docking the operating tool unit with the industrial robot.

An industrial robot refers herein to an automated and programmable robot system suitable for assembling parts and capable of movement on three or more axes. The present industrial robot may be configured to pick components through the operating tool unit before performing one or more operations on a target workpiece. The present industrial robot may be a standard robot or even a robot configured such that different operating tool units can be attached to or retrieved from the target workpiece.

As used herein, a tool changer, also known as a quick-change device, refers to a coupling device with two tool changer matching parts, usually referred to as first tool changer part or master plate and at least one second tool changer part or tool plate, which are designed to lock or couple together, either manually or automatically, and have the ability pass from one side to the other utilities such as electrical signals, pneumatic, and/or other. Said matching parts may also be designed to carry a payload. The master plate usually carries a locking mechanism, for example mechanical or pneumatic, and the tool side carries suitable elements to be engaged by the locking mechanism. A tool changer employed in examples of the present disclosure may be of any known type, for example it may be an automatic tool changer that uses pneumatics to lock the two parts together.

In the present quick tool changer, the first tool changer part is arranged in the industrial robot, while the second tool changer part is arranged in the operating tool unit. Specifically, in the present robotic assembly the industrial robot and the operating tool units will have matching quick tool changers to attach/release from each other. The operating tool units may be thus released and retrieved by the same robot, for example when working in a small space, or by different robots. For example, the operating tool units may be released by one robot and retrieved by another, so that for example it can operate on a target workpiece that is moving from one station to another. Different operating tool units may be thus attached/retrieved by the industrial robot to/from the target workpiece, one after the other.

The operating tool unit is an autonomous unit, that is, it is at least provided with a standalone driving mechanism. Such a standalone driving mechanism is suitable for performing one or more operations on a target workpiece after the operating tool unit has been detached from the industrial robot. This allows the industrial robot to move away from the operating tool unit while the operating tool unit works independently of the industrial robot. Thus, after an operating tool unit has been attached to a target workpiece, the industrial robot may perform other operations on a target workpiece, in parallel with operation of the operating tool unit, and it may prepare the following operation, or another. For this purpose, the operating tool unit may include a standalone power source for operating the above mentioned driving mechanism. The operating tool units may be thus permanently controlled and powered by a power source separate from the industrial robot. However, examples where an external power source is provided for the operating tool unit are not excluded. The preferred case is where the operating tool unit has its own standalone driving mechanism (internal motor) and its own standalone power source. Therefore, the above does not exclude at least one operating tool unit connected by an electrical cable to an external power source. Also the above does not exclude at least one operating tool unit connected by a pneumatic line to an external driving mechanism for performing operations on the target workpiece. In any case, when the industrial robot has moved away from the operating tool unit, the operating tool unit is still powered and driven, working independently of the industrial robot.

In some examples, the operating tool unit may be a secondary industrial robot. Thus, the operating tool unit may be simple or complex, for example it may itself be a smaller robot.

Since the same industrial robot is capable of performing several operations on the target workpiece with different operating tool units which operating tool units are capable of being in operation while detached from the industrial robot, such that assembly times can be optimised. This is significantly advantageous for example when applied to a manufacturing line like an automotive final assembly line. Complex assembly operations, which require a long time as they have usually been performed by a robot travelling on a track synchronized with the advance of the car body, are now simplified by the present robotic assembly. Robot tracks are expensive, and tracks along assembly lines take up space and hinder movements of robots and operators. With the present robotic assembly, at least some of such assembly operations may be performed by one or more operating tool units operatively attached to a target workpiece such as a car body in one station while the target workpiece is advanced along the line. The operating tool unit may be retrieved at a later station by the same or another robot. This saves costs involved in track systems which, with the present robotic assembly, are no longer necessary. This is very advantageous since, as stated above, tracks are very cumbersome elements that have to be installed along the line in prior assemblies. The robots in the present robotic assembly may perform other operations on the target workpiece, e.g. the car body, while the operating tool unit is working.

Additional objects, advantages and features of examples of the present robotic assembly will become apparent to those skilled in the art upon examination of the description, or may be learned by practice thereof.

BRIEF DESCRIPTION OF THE DRAWINGS

One particular non-limiting example of a robotic assembly will be described in the following with reference to the appended drawings, in which.

DETAILED DESCRIPTION OF EXAMPLES

In the non-limiting example of the present robotic assembly shown in figures of the drawings, part of a station 110 in a vehicle assembly line 100, such as a final assembly line, is illustrated. A robotic assembly 200 is provided in said vehicle assembly line 100. The robotic assembly 200 is intended for performing one or more operations on a target workpiece 300. The target workpiece in the example shown is a vehicle body 300. Operations on the vehicle body 300 may for example include one or more of screwing, riveting, trimming, clipping, assembling, etc. in parts of the vehicle body 300. Other operations are of course possible.

Figure 5:
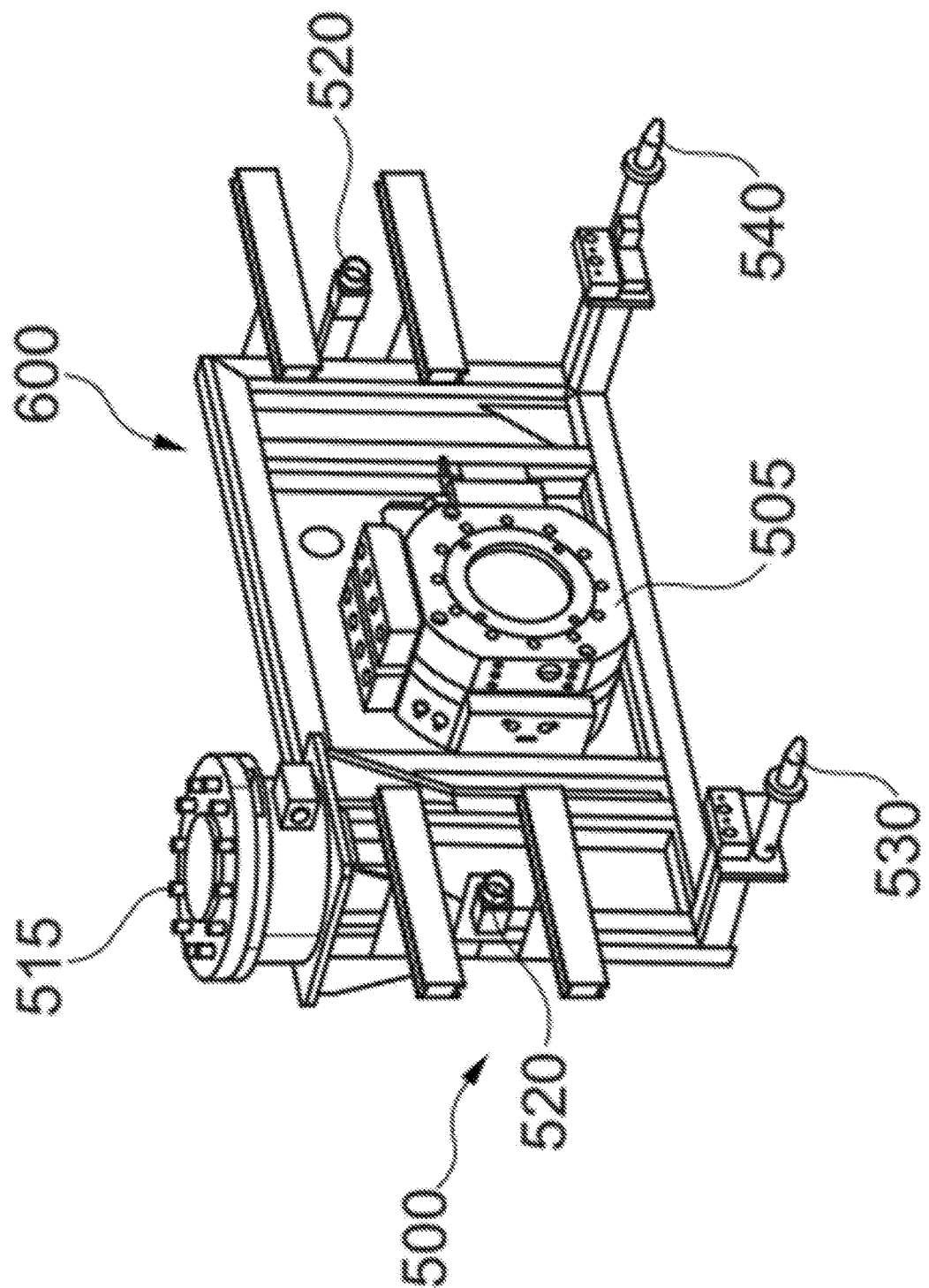
FIG. 5 is a general perspective view of an operating tool unit.

The robotic assembly 200 includes an industrial robot 400 capable of detachably carrying one or more operating tool units 500, one of which has been illustrated in detail in FIG. 5. The operating tool unit 500 includes a base tool unit 505 configured as a common module carrying an operating tool element 535, 545 configured as an interchangeable module. The base tool unit 505 allows to operate taking the vehicle body 300 as a reference, for the different operations performed by the operating tool elements 535, 545 through the use of corresponding centering pins 530, 540 projecting from the operating tool unit 500 for insertion into corresponding holes formed in the vehicle body 300. The operating tool elements 535, 545 are coupled to the base tool unit 505 through a quick-changer device.

Figure 3:
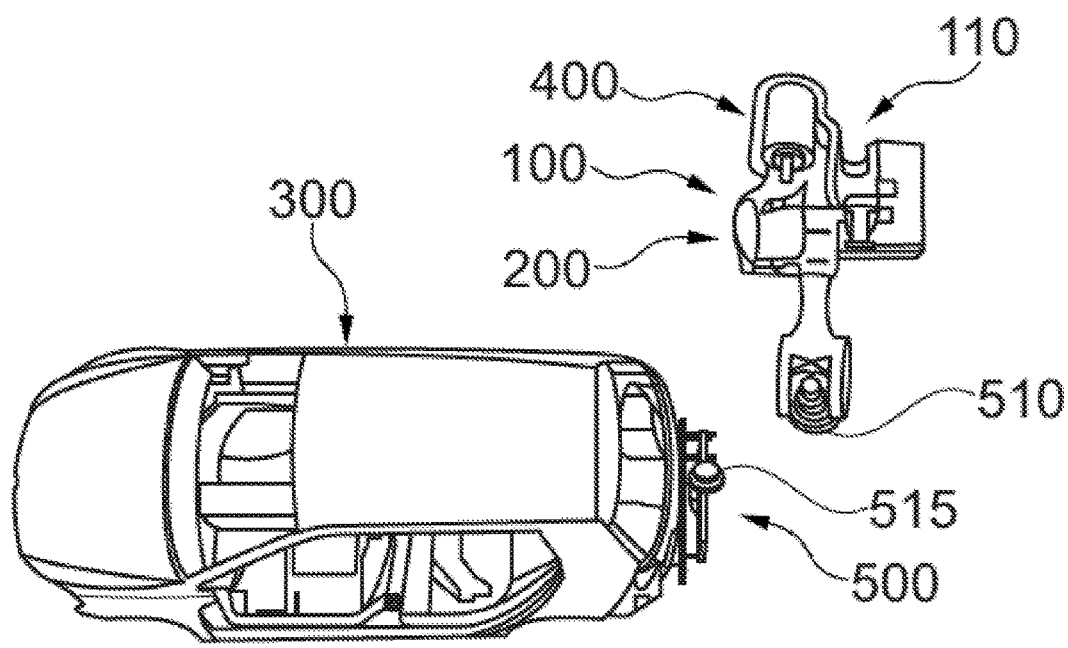

The operating tool unit 500 further includes a connection part or tool changer part 515 for attachment to corresponding tool changer parts such as a robot wrist, not shown, in the industrial robot 400. More specifically, a first tool changer part 510 is arranged in the industrial robot 400, and a second tool changer part 515 arranged in the operating tool unit 500 as shown in FIG. 3 of the drawings. As shown in FIG. 5, the operating tool unit 500 further includes a vision system 520 for assisting the industrial robot 400 with the operating tool unit 500 in moving towards a vehicle body 300.

Detachable coupling of operating tool units 500 to the industrial robot 400 is carried out by the above mentioned tool changer parts 510, 515 shown in the figures of the drawings. The tool changer parts 510, 515 are configured such that different operating tool units 500 can be retrieved from the vehicle body 300, one after the other, by the same or different industrial robot 400.

Figure 4:
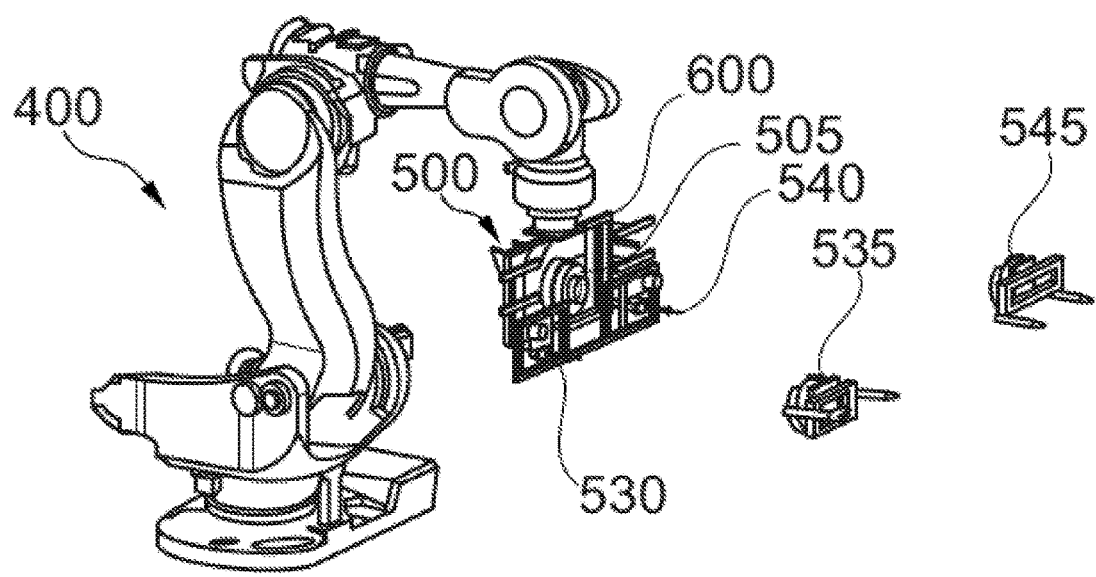
FIG. 4 is a general perspective view of a first example of a robotic assembly in a vehicle body assembly station.

It is to be noted that in the example shown in FIG. 4, the vehicle body 300 is referenced with the base tool unit 505 through the use of corresponding centering pins 530, 540. This allows different operating tool elements 535, 545 to be used for different operations through said quick change device.

The tool changer parts 510, 515 are arranged between the industrial robot 400 and the operating tool unit 500. This is shown in FIG. 3 which illustrates the operating tool unit 500 detached from the industrial robot 400 and coupled to the vehicle body 300, with the industrial robot 400 moving away from the operating tool unit 500. Optionally, in a further example, another quick tool changer 600 is arranged between the tool unit 505 and the operating tool elements 535, 545 as shown in FIG. 4. In another example, no tool changer parts 510, 515 are provided so the industrial robot 400 is directly attached to the operating tool unit 500.

The operating tool unit 500 includes a standalone driving mechanism, i.e. its own motor, and a standalone power source for operating the motor. The operating tool unit 500 is thus allowed to perform operations on the vehicle body 300 after it has been detached from the industrial robot 400 and the industrial robot 400 has been moved away, as shown in FIG. 3. After said industrial robot 400 has been moved away from an operating tool unit 500 once they have been detached from each other, the industrial robot 400 is allowed to perform another operation on the same or different vehicle body 300. It is to be noted that the operations on the vehicle body 300 through the operating tool unit 500 are performed while the operating tool unit 500 moves with the vehicle body 300.

The industrial robot 400 is thus capable of performing several different operations on the vehicle body 300 with different operating tool units 500. The operating tool units 500 are capable of being in operation while detached from the industrial robot 400. The operating tool units 500 may be then retrieved by the same industrial robot 400, for example, when working in a small space, or by a different industrial robot 400 in the same station or coming from a different station.

In some examples, the operating tool unit 500 may be a secondary industrial robot such as a smaller robot.

Operations on the vehicle body 300 may be thus performed by one or more operating tool units 500 attached thereto in one station 110 while the vehicle body 300 is advanced along the vehicle assembly line 100.

Based on the above configuration, the robotic assembly 200 operates as follows for performing operations on the vehicle body 300 in the example shown in the figures.

Figure 1:
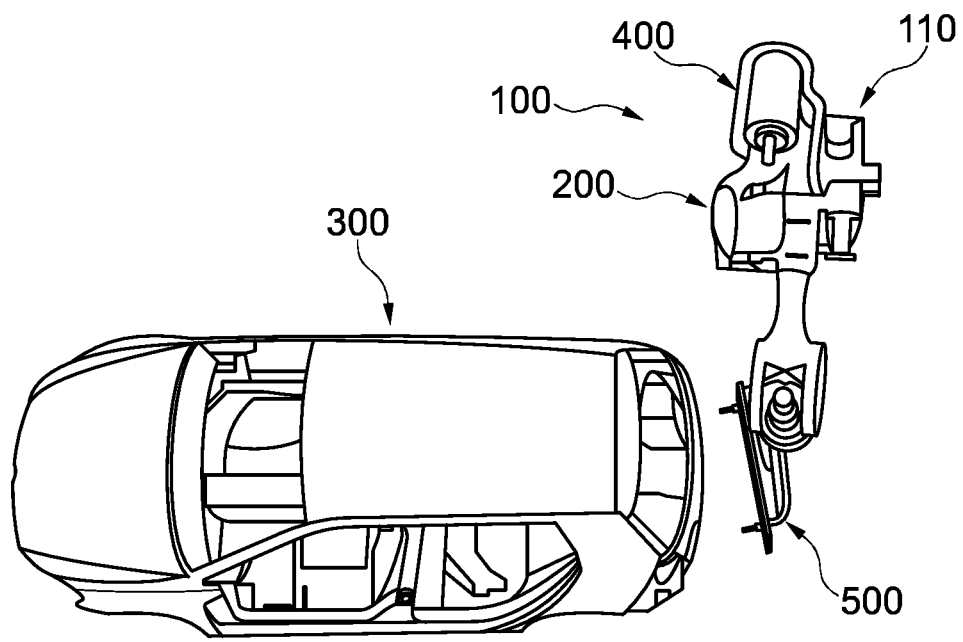
FIGS. 1-3 are general perspective views of the vehicle body assembly station with the robotic assembly shown in different operating positions.

Starting from FIG. 1, industrial robot 400 takes operating tool unit 500 and moves towards vehicle body 300 by, for example, visual or compliance technologies.

Figure 2:
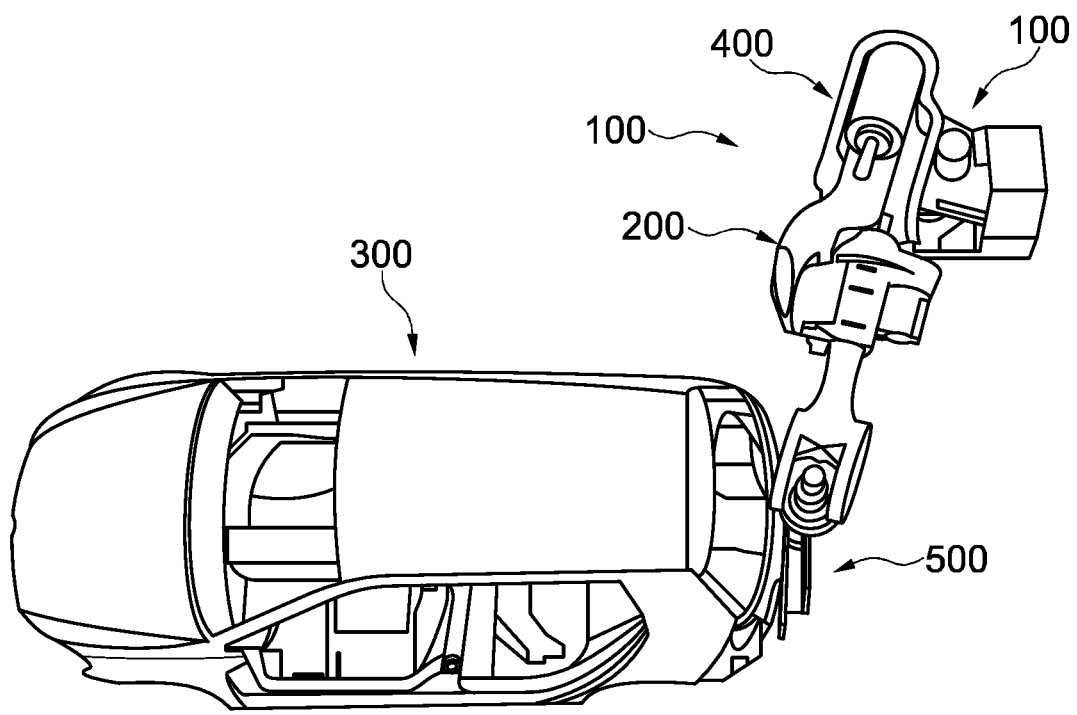

The operating tool unit 500 is docked to the vehicle body 300, through for example centering pins 530, 540 arranged to provide a reference position, by mechanical, magnetic, or a vacuum system and released in a suitable position as shown in FIG. 2.

Reference is again made to FIG. 3. Then, the industrial robot 400 is moved away from the operating tool unit 500 as shown in FIG. 3 while the operating tool unit 500 remains at the vehicle body 300 to perform operations such as screwing, riveting, trimming, clipping, or assembling. Since the operating tool unit 500 performs such operations with the industrial robot 400 therefrom, the industrial robot 400 is allowed to perform some other tasks in the meantime.

Once operations on the vehicle body 300 by the operating tool unit 500 have been completed, the operating tool unit 500 is retrieved from the vehicle body 300. Retrieving the operating tool unit 500 from the vehicle body 300 includes connecting the same or another industrial robot 400 to the operating tool unit 500 and releasing said operating tool unit 500 from the vehicle body 300.

In an alternative method, steps are performed as described above but when the operating tool unit 500 has been released from the industrial robot 400, the industrial robot 400 does not move away from the operating tool unit 500 while performing operations on the target workpiece 300.

In both methods described above, the centering pins 530, 540 may be used regardless of whether the industrial robot 400 moves away from the operating tool unit 500 or not when the operating tool unit 500 has been released therefrom.

Although only a number of particular examples of the present vehicle body assembly station have been disclosed herein, it will be understood by those skilled in the art that other alternative examples and/or uses and obvious modifications and equivalents thereof are possible.

The present disclosure thus covers all possible combinations of the particular examples of the present vehicle body assembly station that have been described. The scope of the present disclosure should not be limited by the present example but should be determined only by a fair reading of the claims that follow.

Reference signs related to drawings and placed in parentheses in a claim are solely for attempting to increase the intelligibility of the claim and shall not be construed as limiting the scope of the claim.

The invention claimed is:

1. A method for performing operations on a target workpiece, the method comprising:
    taking an operating tool unit by an industrial robot;
    carrying the operating tool unit to the target workpiece;
    releasing the operating tool unit in a suitable position at the target workpiece;
    moving the industrial robot away from the operating tool unit;
    performing one or more operations on the target workpiece through the operating tool unit as the target workpiece is moving from one station to another station once the tool unit has been released from the robot while the robot performs other tasks; and
    retrieving the operating tool unit from the target workpiece after the operating tool unit has performed said one or more operations on the target workpiece.

2. The method of claim 1, further including performing the one or more operations on the target workpiece through the operating tool unit while the operating tool unit moves with the target workpiece.

3. The method of claim 2, further including performing the carrying of the operating tool unit to the target workpiece by referring to a position of a mechanical feature selected from one or more of holes, recesses, protrusions, and clamps.

4. The method of claim 2, the carrying of the operating tool unit to the target workpiece comprises docking the operating tool unit to the target workpiece.

5. The method of claim 2, the retrieving of the operating tool unit from the target workpiece includes connecting the same or another industrial robot to the operating tool unit and releasing the operating tool unit from the target workpiece.

6. The method of claim 2, the taking of an operating tool unit by the industrial robot comprises moving the industrial robot towards the target workpiece and docking the operating tool unit to the target workpiece.

7. The method of claim 1, further including performing the carrying of the operating tool unit to the target workpiece by referring to a position of a mechanical feature selected from one or more of holes, recesses, protrusions, and clamps.

8. The method of claim 1, the carrying of the operating tool unit to the target workpiece comprising docking the operating tool unit to the target workpiece.

9. The method of claim 8, the performing of the docking of the operating tool unit to the target workpiece is by one or more of mechanical, magnetic, or vacuum systems.

10. The method of claim 1, the retrieving of the operating tool unit from the target workpiece includes connecting the same or another industrial robot to the operating tool unit and releasing the operating tool unit from the target workpiece.

11. The method of claim 1, the taking of the operating tool unit by the industrial robot further comprises moving the industrial robot towards the target workpiece and docking the operating tool unit to the target workpiece.

12. The method of claim 11, the moving of the industrial robot towards the target workpiece involves reaching a desired suitable positioning through one or more of visual technology and compliance technology.

13. A robotic assembly for performing operations on a target workpiece according to a method as claimed in claim 1, the robotic assembly comprising
    at least one industrial robot,
    at least one operating tool unit, and
    a quick tool changer for detachably coupling the operating tool unit with the industrial robot, the quick tool changer comprising
        a first tool changer part arranged in the industrial robot and
        a second tool changer part arranged in the operating tool unit,
    the operating tool unit including a standalone driving mechanism for performing one or more operations on a target workpiece after the operating tool unit has been detached from the industrial robot allowing the industrial robot to move away from the operating tool unit.

14. The robotic assembly of claim 13, the operating tool unit including a standalone power source for operating the driving mechanism.

15. The robotic assembly of claim 13, further comprising a base tool unit for coupling different operating tool elements.

16. The robotic assembly of claim 13, the industrial robot being configured such that different operating tool units can be attached to or retrieved from the target workpiece.

17. The robotic assembly of claim 13, the quick tool changer being configured such that different operating tool units can be retrieved from the target workpiece, one after the other.

18. The robotic assembly of claim 13, the operating tool unit being configured to perform at least one operation like screwing, riveting, trimming, clipping, and assembling.

19. The robotic assembly of claim 13, the industrial robot being configured to pick components through the operating tool unit before performing operations on a target workpiece.

20. The robotic assembly of claim 13, the operating tool unit being a secondary industrial robot.

* * * * *